(12) United States Patent
Yun (10) Patent No.: US 12,350,998 B2
(45) Date of Patent: Jul. 8, 2025

(54) MODULAR AIR CONDITIONING SYSTEM FOR ELECTRIC VEHICLE

(71) Applicants: Hyundai Motor Company, Seoul (KR); Kia Corporation, Seoul (KR)

(72) Inventor: Nam-Seok Yun, Hwaseong-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 5 days.

(21) Appl. No.: 18/221,259

(22) Filed: Jul. 12, 2023

(65) Prior Publication Data

US 2024/0270046 A1 Aug. 15, 2024

(30) Foreign Application Priority Data

Feb. 10, 2023 (KR) .................. 10-2023-0018173

(51) Int. Cl.
*B60H 1/00* (2006.01)
*B60H 1/14* (2006.01)
*B60H 1/32* (2006.01)

(52) U.S. Cl.
CPC ..... *B60H 1/00542* (2013.01); *B60H 1/00271* (2013.01); *B60H 1/00278* (2013.01); *B60H 1/00392* (2013.01); *B60H 1/00921* (2013.01); *B60H 1/143* (2013.01); *B60H 1/32281* (2019.05); *B60H 1/3229* (2013.01); *B60H 2001/00307* (2013.01); *B60H 2001/3286* (2013.01)

(58) Field of Classification Search
CPC ............ B60H 1/00542; B60H 1/00271; B60H 1/00278; B60H 1/32281; B60H 1/32284
See application file for complete search history.

(56) References Cited

U.S. PATENT DOCUMENTS

| 7,096,925 | B2 * | 8/2006 | Bracciano | B60H 1/00542 |
| | | | | 219/202 |
| 9,573,437 | B2 * | 2/2017 | Osaka | B60H 1/32281 |
| 9,902,236 | B2 * | 2/2018 | Martinell | B60H 1/00071 |
| 10,668,926 | B2 * | 6/2020 | Birnschein | B60R 16/0231 |
| 10,967,702 | B2 * | 4/2021 | Mancini | B60H 1/00564 |
| 11,279,206 | B1 * | 3/2022 | Mueller | B60H 1/247 |
| 11,331,980 | B2 * | 5/2022 | Lee | B60H 1/00899 |
| 11,370,265 | B2 * | 6/2022 | Lee | B60H 1/00885 |
| 11,446,978 | B2 * | 9/2022 | Bara | B60H 1/00392 |
| 11,479,076 | B2 * | 10/2022 | Kim | B60H 1/00485 |
| 11,525,611 | B2 * | 12/2022 | Sugimura | H01M 10/6567 |

(Continued)

FOREIGN PATENT DOCUMENTS

KR 10-2015-0044120 A 4/2015

*Primary Examiner* — Christopher R Zerphey
(74) *Attorney, Agent, or Firm* — Morgan, Lewis & Bockius LLP (57) ABSTRACT

A modular air conditioning system for an electric vehicle is configured as an integrated module that performs in-vehicle air-cooling, in-vehicle air-heating, and battery cooling. The modular air conditioning system includes a dash panel making a division of the vehicle into a power electric (PE) system room in which a PE system for the vehicle is provided and a passenger compartment in which an occupant rides, and a housing provided to pass through the dash panel, wherein a heating and cooling module that supplies conditioned air to the passenger compartment, cools a battery for the electric vehicle, or cools the PE system is provided inside the housing.

19 Claims, 8 Drawing Sheets

(56) References Cited

U.S. PATENT DOCUMENTS

| | | | | |
|---|---|---|---|---|
| 11,752,828 B2* | 9/2023 | Harmon | ............. | B60H 1/00564 |
| | | | | 454/120 |
| 11,752,833 B2* | 9/2023 | Durrani | ................. | B60H 1/143 |
| | | | | 165/202 |
| 11,760,162 B2* | 9/2023 | Dong | .................. | H01M 10/613 |
| | | | | 62/324.1 |
| 11,807,066 B2* | 11/2023 | Hwang | ............. | B60H 1/00878 |
| 11,850,909 B2* | 12/2023 | Shin | ...................... | B60H 1/143 |
| 11,897,316 B2* | 2/2024 | Makimoto | ......... | B60H 1/00278 |
| 2017/0297414 A1* | 10/2017 | Beloe | ................ | B60H 1/00885 |
| 2019/0111756 A1* | 4/2019 | Makimoto | ............ | B60H 1/004 |
| 2022/0325930 A1* | 10/2022 | Day | .................. | B60H 1/00907 |
| 2023/0158860 A1* | 5/2023 | Kim | .................... | B60H 1/3205 |
| | | | | 62/115 |
| 2023/0322041 A1* | 10/2023 | White | ................ | B60H 1/00278 |
| | | | | 62/460 |
| 2023/0406073 A1* | 12/2023 | Guan | ................ | B60H 1/00485 |

\* cited by examiner

MODULAR AIR CONDITIONING SYSTEM FOR ELECTRIC VEHICLE

CROSS-REFERENCE TO RELATED APPLICATION

The present application claims priority to Korean Patent Application No. 10-2023-0018173, filed on Feb. 10, 2023, the entire contents of which is incorporated herein for all purposes by this reference.

BACKGROUND OF THE PRESENT DISCLOSURE

Field of the Present Disclosure

The present disclosure relates to a modular air conditioning system for an electric vehicle, the system being configured as an integrated module that performs in-vehicle air-cooling, in-vehicle air-heating, and battery cooling.

Description of Related Art

In recent years, the rapid advance in vehicle electrification has brought about an increase in supply for electric vehicles.

Purpose-built vehicles (PBVs) have been provided as examples of providing a solution to future mobility based on the electric vehicles.

Application of autonomous-traveling technology to the PBV eliminates the need for a driver to keep his or her eyes on a driving situation or to drive the PBV. Therefore, occupants including the driver may sit on their respective seats while facing each other in the travelling PBV.

In the PBV, air-cooling or air-heating is also performed such that a temperature of a passenger compartment in which the occupant rides reaches a temperature which is set by the occupant. Furthermore, a power electric (PE) system itself also needs to be cooled due to heat generated during vehicle traveling, and a battery needs to be cooled due to heat generated during charging or discharging operation.

Generally, various components for in-vehicle air-cooling, in-vehicle air-heating, battery cooling, and the like may be discretely mounted on one side of the vehicle, for example, on one portion of the interior of the vehicle or on a roof of the vehicle, and such the components may be connected to each other with a pipe.

When the various components are disposed on one portion of the interior of the vehicle, the modular air conditioning system as described above is not exposed to the roof. Therefore, an external appearance of the vehicle is improved, but there occur problems, such as a disadvantage in securing an in-vehicle space.

In contrast, when the various components are disposed on the roof of the vehicle, the capacity of the modular air conditioning system may be easily increased as required, but the modular air conditioning system is exposed to the outside thereof. Thus, there occur problems, such as a decrease in marketability of the vehicle in terms of its external appearance, which needs a cover member to cover the external appearance of the air conditioning system, and needs to increase the rigidity of the roof of the vehicle.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a modular air conditioning system provided inside a vehicle for an electric vehicle, components of the system being configured, as an integrated module that is configured to perform in-vehicle air-cooling, in-vehicle air-heating, and battery cooling.

To accomplish the above-mentioned object, according to an aspect of the present disclosure, there is provided a modular air conditioning system for an electric vehicle, the system including: a dash panel making a division of the vehicle into a power electric (PE) system room in which the PE system for an electric vehicle is provided and a passenger compartment in which an occupant rides; and a housing provided to pass through the dash panel, wherein a heating and cooling module that supplies conditioned air to the passenger compartment, cools a battery for the electric vehicle, or cools the PE system is provided inside the housing.

In the modular air conditioning system, the heating and cooling module may include a compressor configured to compress a refrigerant; a water-cooling condenser through which a PE system coolant cooling the PE system flows and in which the PE system coolant and the refrigerant exchange heat with each other; an in-vehicle heat exchanger in which the refrigerant and air in the passenger compartment exchange heat with each other; a first expansion valve mounted at an entrance of the in-vehicle heat exchanger; and a direction control valve configured to switch a flowing direction of the refrigerant compressed by the compressor, wherein an air-cooling condenser in which the refrigerant and outside air exchange heat with each other may be provided in the PE system room.

In the modular air conditioning system, a heat exchange portion partitioned by a wall inside the housing in which air introduced from the passenger compartment may be heat exchanged therein.

In the modular air conditioning system, the in-vehicle heat exchanger and a blower supplying the conditioned air to the passenger compartment may be provided in the heat exchange portion.

In the modular air conditioning system, a positive temperature coefficient (PTC) heater may be provided in the heat exchange portion.

In the modular air conditioning system, a refrigerant line may be formed so that the refrigerant may circulate through the compressor, the direction control valve, the water-cooling condenser, the air-cooling condenser, the first expansion valve, and the in-vehicle heat exchanger and then back to the compressor through the direction control valve.

In the modular air conditioning system, the heating and cooling module may further include a chiller through which a battery coolant cooling the battery flows and in which the battery coolant and the refrigerant exchange heat with each other, and the refrigerant line may branch off from the exit of the air-cooling condenser and may be connected to the direction control valve to pass through the chiller.

In the modular air conditioning system, a second expansion valve may be provided at the entrance of the chiller.

In the modular air conditioning system, the refrigerant line may be formed to branch off from a three-way valve mounted between the air-cooling condenser and the first expansion valve and to connect the water-cooling condenser and the air-cooling condenser to each other.

In the modular air conditioning system, a third expansion valve may be provided between the three-way valve and the air-cooling condenser.

In the modular air conditioning system, when the heating and cooling module is required to operate in an air-cooling mode, the refrigerant may circulate through the compressor, the direction control valve, the water-cooling condenser, the air-cooling condenser, the first expansion valve, the in-vehicle heat exchanger, and the direction control valve, may be expanded in the first expansion valve, and may cool air, introduced from the passenger compartment, in the in-vehicle heat exchanger.

In the modular air conditioning system, when the heating and cooling module is required to operate in a chiller mode, the refrigerant may circulate through the compressor, the direction control valve, the water-cooling condenser, the air-cooling condenser, the second expansion valve, the chiller, and the direction control valve, may be expanded in the second expansion valve, and may cool the battery coolant in the chiller.

In the modular air conditioning system, when the heating and cooling module is required to operate in an air-cooling and chiller mode, a portion of the refrigerant may circulate through the compressor, the direction control valve, the water-cooling condenser, the air-cooling condenser, the first expansion valve, the in-vehicle heat exchanger, and the direction control valve, may be expanded in the first expansion valve, and may cool air, introduced from the passenger compartment, in the in-vehicle heat exchanger, and the remaining portion of the refrigerant may dividedly circulate from the exit of the air-cooling condenser to the second expansion valve, the chiller, and the direction control valve, may be expanded in the second expansion valve, and may cool the battery coolant in the chiller.

In the modular air conditioning system, when the heating and cooling module is required to operate in an air-heating mode, the refrigerant may circulate through the compressor, the direction control valve, the in-vehicle heat exchanger, the first expansion valve, the second expansion valve, the water-cooling condenser, and the direction control valve and may air-heat air, introduced from the passenger compartment, in the in-vehicle heat exchanger.

In the modular air conditioning system, in the air-heating mode, a PTC heater provided in a heat exchange portion formed inside the housing may operate.

In the modular air conditioning system, when the heating and cooling module is required to operate in a dehumidification mode, the refrigerant may circulate through the compressor, the direction control valve, the water-cooling condenser, the air-cooling condenser, the first expansion valve, the in-vehicle heat exchanger, and the direction control valve and may be expanded in the first expansion valve, and a PTC heater, provided in a heat exchange portion formed inside the housing, may operate.

In the modular air conditioning system, an inlet duct along which air is introduced from the passenger compartment into the heat exchange portion, a vent duct along which conditioned air is sent from the heat exchange portion to the passenger compartment, and a floor duct along which the conditioned air is sent from the heat exchange portion to a floor of the passenger compartment may be connected to the heat exchange portion.

In the modular air conditioning system, the floor duct may branch off from an air duct along which the conditioned air is sent to a second-row duct of the electric vehicle.

In the modular air conditioning system, the electric vehicle may be a purpose-built vehicle (PBV).

Components of the modular air conditioning system for an electric vehicle according to an exemplary embodiment of the present disclosure, which employs the configuration as described above, are configured as one module that temperature-increases and decreases the interior of the vehicle and cools the battery, respectively, to be positioned between the PE system room and the passenger compartment. Thus, there is an advantage in securing an in-vehicle space.

Furthermore, there is no need to arrange the heating and cooling module on a roof of the vehicle. Thus, marketability of the vehicle in terms of its external appearance may be improved. A reinforcement member for securing the rigidity of the roof is unnecessary.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

A modular air conditioning system for an electric vehicle according to an exemplary embodiment of the present disclosure will be described in detail below with reference to the accompanying drawings.

Figure 1:
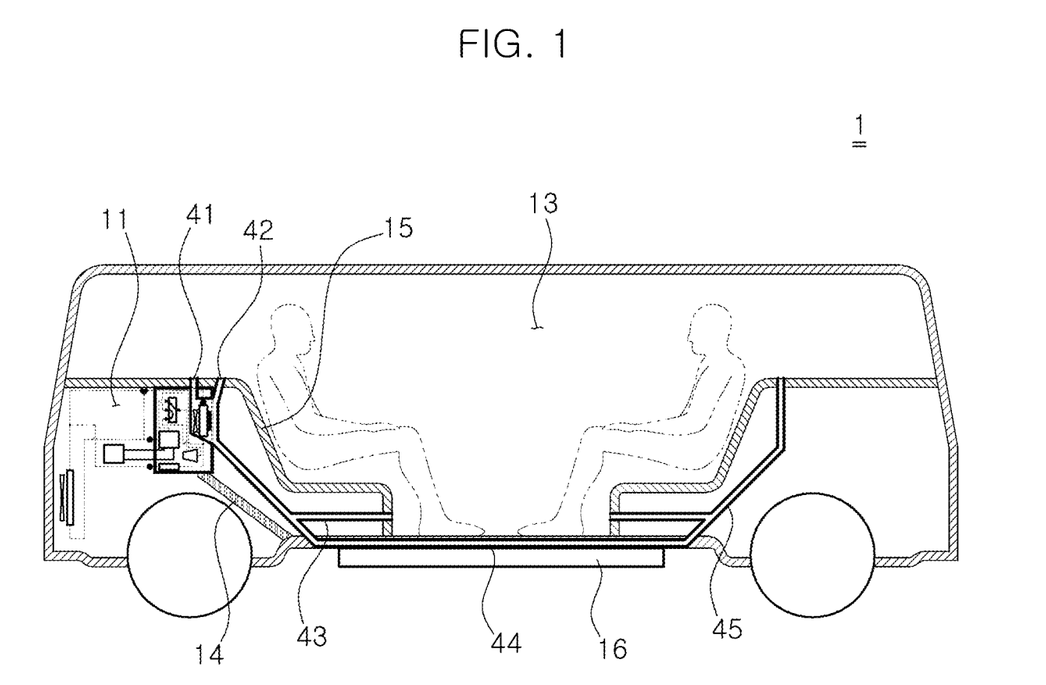
FIG. 1 is a schematic view exemplarily illustrating a vehicle in which a modular air conditioning system for an electric vehicle according to an exemplary embodiment of the present disclosure finds application.
Figure 2:
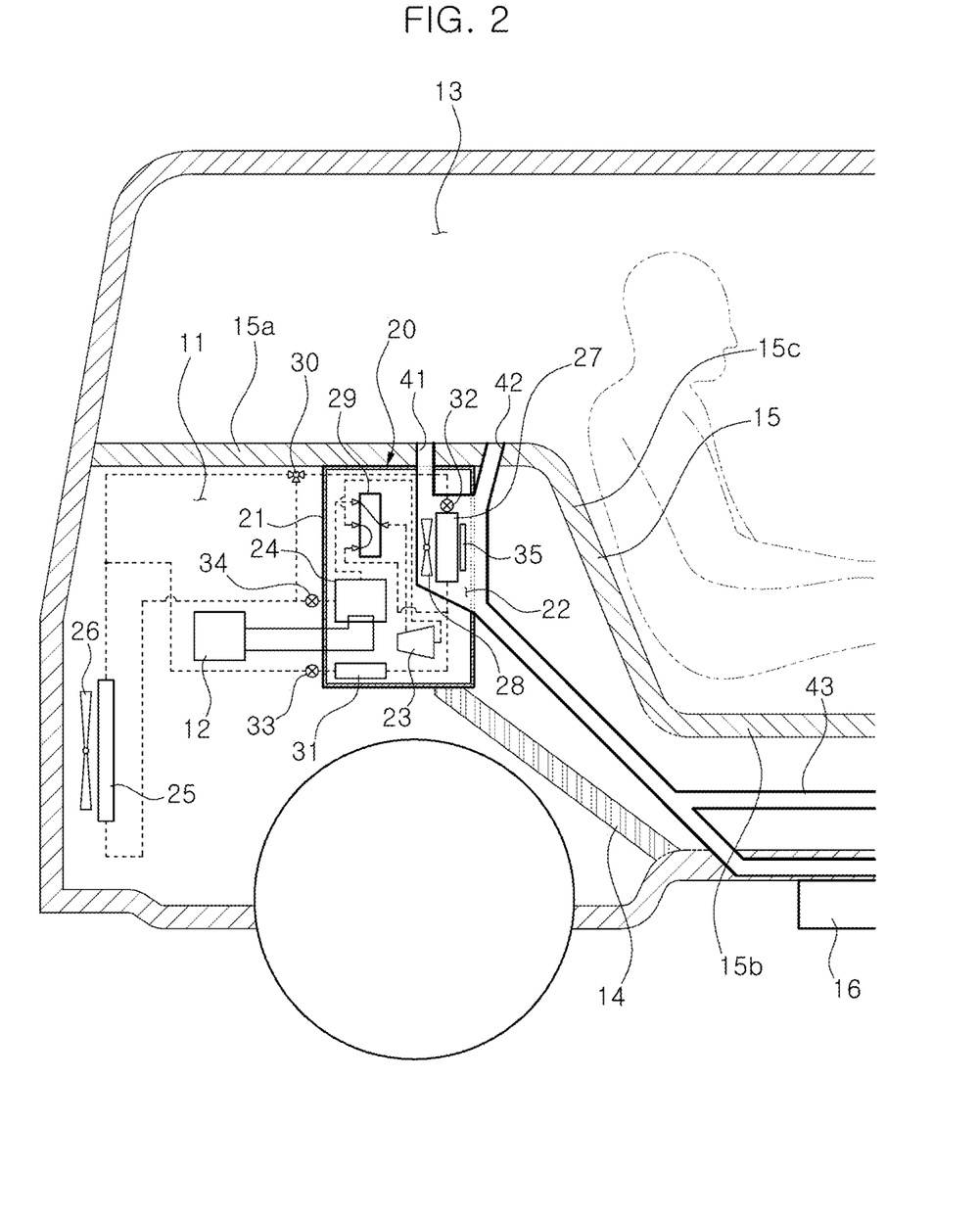
FIG. 2 is a schematic enlarged view exemplarily illustrating a state where the modular air conditioning system for an electric vehicle according to an exemplary embodiment of the present disclosure is provided.

The modular air conditioning system for an electric vehicle according to an exemplary embodiment of the present disclosure may include a dash panel 14 that makes a division of the vehicle into a power electric (PE) system room 11 in which a PE system 12 for an electric vehicle 1 is provided and a passenger compartment 13 in which an occupant rides, and a housing 21 which is provided to pass through the dash panel 14. In the modular air conditioning system, a heating and cooling module 20 that supplies conditioned air to the passenger compartment 13, cools a battery 16 for the electric vehicle 1, or cools the PE system 12 may be provided inside the housing 21.

The housing 21 may form an external appearance of the heating and cooling module 20, and components that form the modular air conditioning system may be disposed inside the housing 21.

In the electric vehicle 1, the housing 21 may be provided on the dash panel 14 that makes a division into the PE system room 11 in which the power electric (PE) system is disposed and the passenger compartment 13 of the electric vehicle 1. It is preferred that the electric vehicle is a purpose-built vehicle (PBV).

The components that form the heating and cooling module 20 are disposed inside the housing 21, and thus the heating and cooling module 20 for air-cooling and air-heating the passenger compartment 13 of the electric vehicle (hereinafter referred to as the "vehicle") 1 and cooling the battery 16 may be configured as one module.

In the instant case, most of the components may be disposed inside the housing 21, but an air-cooling condenser 25 that exchanges heat with outside air and a cooling fan 26 that blows the outside air to the air-cooling condenser 25 are disposed in the PE system room 11.

Accordingly, components other than the air-cooling condenser 25 and the cooling fan 26 are disposed inside the housing 21.

A heat exchange portion 22 may be formed, as a separate space, by a wall partitioning off one side of the housing 21. Air may be introduced from the passenger compartment 13 of the vehicle 1 into the heat exchange portion 22 and then may be cooled or temperature-increased and may be supplied back to the passenger compartment 13. Thus, the passenger compartment 13 may be air-cooled or air-heated.

A compressor 23 may be provided inside the housing 21. The compressor 23 may compress a refrigerant and may discharge the compressed refrigerant. The compressor 23 may compress the refrigerant and may circulate the refrigerant so that the heating and cooling module 20 operates as a cooling apparatus or a heat pump.

A water-cooling condenser 24 may be provided inside the housing 21, and the refrigerant may flow through the water-cooling condenser 24. Furthermore, a PE system line that cools the PE system 12 passes through the water-cooling condenser 24. Thus, when the heating and cooling module 20 operates as the heat pump, the water-cooling condenser 24 may absorb heat from a PE system coolant that cools the PE system 12.

The air-cooling condenser 25 may be provided in the PE system room 11. The air-cooling condenser 25 may be provided in the PE system room 11 so that the refrigerant and outside air exchange heat with each other. Thus, the refrigerant flowing through the air-cooling condenser 25 and the outside air may exchange heat with each other.

The cooling fan 26 may be provided adjacent to the air-cooling condenser 25 and blows outside air to the air-cooling condenser 25.

An in-vehicle heat exchanger 27 may be positioned inside the housing 21. Air introduced from the passenger compartment 13 may exchange heat in the in-vehicle heat exchanger 27. The in-vehicle heat exchanger 27 may be provided inside the heat exchange portion 22.

A blower 28 blows the air that exchanges heat in the in-vehicle heat exchanger 27 toward the passenger compartment 13.

A direction control valve 29 switches between directions in which the refrigerant pressurized by the compressor 23 and then discharged therefrom circulates. The direction in which the refrigerant circulates in a case where the heating and cooling module 20 may operate for air-cooling the passenger compartment 13 may be different from the direction in which the refrigerant circulates in a case where the heating and cooling module 20 may operate as a heat pump. Accordingly, the direction control valve 29 may switches between the directions in which the refrigerant circulates.

A three-way valve 30 may be provided between the air-cooling condenser 25 and the in-vehicle heat exchanger 27. Thus, the refrigerant may flow between the air-cooling condenser 25 and the in-vehicle heat exchanger 27. Alternatively, the refrigerant dividedly may flow between the air-cooling condenser 25 and the in-vehicle heat exchanger 27 and then flows between the water-cooling condenser 24 and the air-cooling condenser 25.

In a chiller 31, the refrigerant may exchange heat with a battery coolant that cools the battery 16. The chiller 31 may be provided on one portion of the inside of the housing 21 to be positioned between the air-cooling condenser 25 and the direction control valve 29. Thus, the refrigerant cooled in the air-cooling condenser 25 may flow through the chiller 31. Furthermore, a cooling line along which the battery coolant flows may pass through the chiller 31, and the coolant and the battery may cool and exchange heat with each other in the chiller 31.

A first expansion valve 32, a second expansion valve 33, and the third expansion valve 34 may be provided at the entrance of the in-vehicle heat exchanger 27, the entrance of the chiller 31, and the entrance of the water-cooling condenser 24, respectively. The first expansion valve 32, the second expansion valve 33, and the third expansion valve 34 may operate in any one of an expansion state, an open state, and a closed state, in accordance with an operating mode of the heating and cooling module.

The three-way valve 30, the second expansion valve 33, and the third expansion valve 34 are illustrated, in the drawing, as being positioned outside the housing 21, but may be provided inside the housing 21.

A configuration of a refrigerant line 50 along which the refrigerant circulates in the heating and cooling module 20 is described as follows. The refrigerant line 50 may be connected from the compressor 23 to the direction control valve 29. The refrigerant line 50 may be connected from the direction control valve 29 through the water-cooling condenser 24 and the air-cooling condenser 25 to in-vehicle heat exchanger 27 and may be connected from the in-vehicle heat exchanger 27 to the direction control valve 29. The refrigerant line 50 may be connected to the direction control valve 29 so that the refrigerant flows back to the compressor 23.

The coolant line 60 may branch off from the exit side of the air-cooling condenser 25 and may be connected to the direction control valve 29 to pass through the chiller 31 and then to join the exit side of the in-vehicle heat exchanger 27. Furthermore, the three-way valve 30 may be provided between the air-cooling condenser 25 and the in-vehicle heat exchanger 27, and the refrigerant line 50 branching off from the three-way valve 30 may connect the water-cooling condenser 24 and the air-cooling condenser 25 to each other.

A PTC heater 35 may be disposed inside the housing 21, that is, inside the heat exchange portion 22. Regardless of the flowing of the refrigerant, when electric power is applied to the PTC heater 35, the PTC heater 35 may be heated and operates to cause temperature-increased air to flow into the passenger compartment 13.

An inlet duct 41 along which air is introduced from the passenger compartment 13 may be formed in the heat exchange portion 22.

Figure 8:
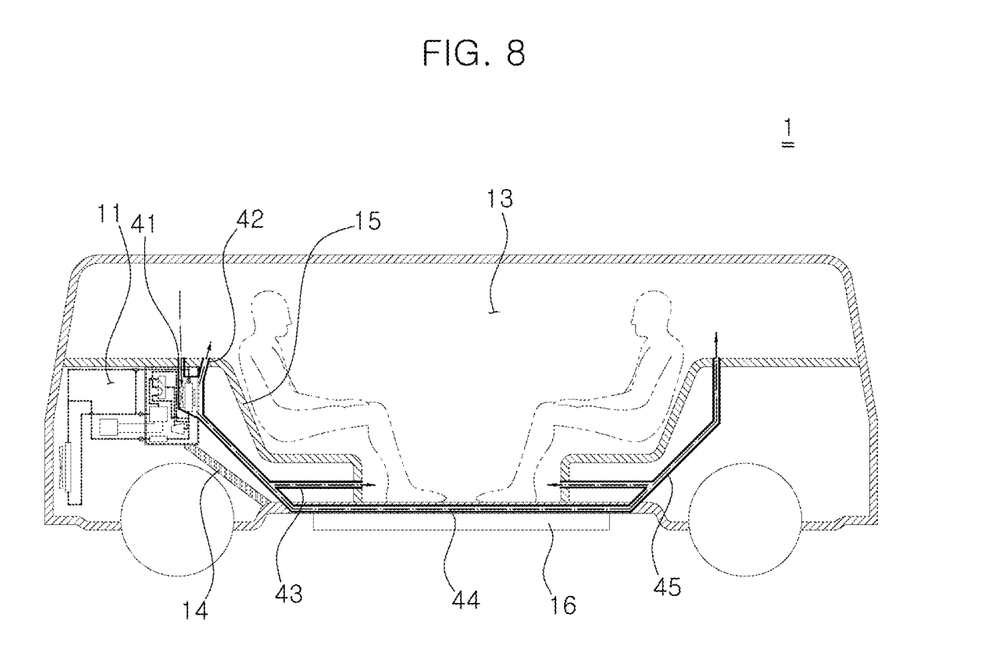
FIG. 8 is a schematic view exemplarily illustrating a state where conditioned air is supplied to a second-row duct in the vehicle in which the modular air conditioning system for an electric vehicle according to an exemplary embodiment of the present disclosure.

The air introduced into the inlet duct 41 may be cooled or temperature-increased in the heat exchange portion 22 and then may be supplied to the passenger compartment 13. To the present end, a vent duct 42 along which conditioned air is sent to a middle portion of the passenger compartment 13 and a floor duct 43 along which the conditioned air is sent to a lower portion of the passenger compartment 13 are formed on a flat upper portion 15a and a flat lower portion 15b of a first row seat 15, respectively, to be connected to the heat exchange portion 22 that passes through the first-row seat 15. The first row seat 15 further includes an inclined portion 15c connecting the flat upper portion 15a and the flat lower portion 15b. The floor duct 43 may be connected to a second-row duct 45 formed on the second-row seat side through the air duct 44. Air conditioned in the heat exchange portion 22 may flow along the floor duct 43, and a portion of the conditioned air dividedly flows to the air duct 44 and then to the second-row duct 45.

A controller is configured to control operation of the heating and cooling module 20 at the request of the occupant or according to a state of the vehicle 1. When the heating and cooling module 20 needs to operate at the request of the occupant or according to the state of the vehicle 1, the controller may be configured to determine whether or not the compressor 23, the direction control valve 29, the three-way valve 30, the first expansion valve 32 to the third expansion valve 34, the PTC heater 35, the cooling fan 26 and the blower 28, may operate according to the required operating mode and is configured to control operation of each thereof.

Operation of the modular air conditioning system for an electric vehicle according to an exemplary embodiment of the present disclosure that includes the configuration as described above is referred to as follows.

The heating and cooling module 20 may be operated by the controller, depending on each of the operating modes described below.

Figure 3:
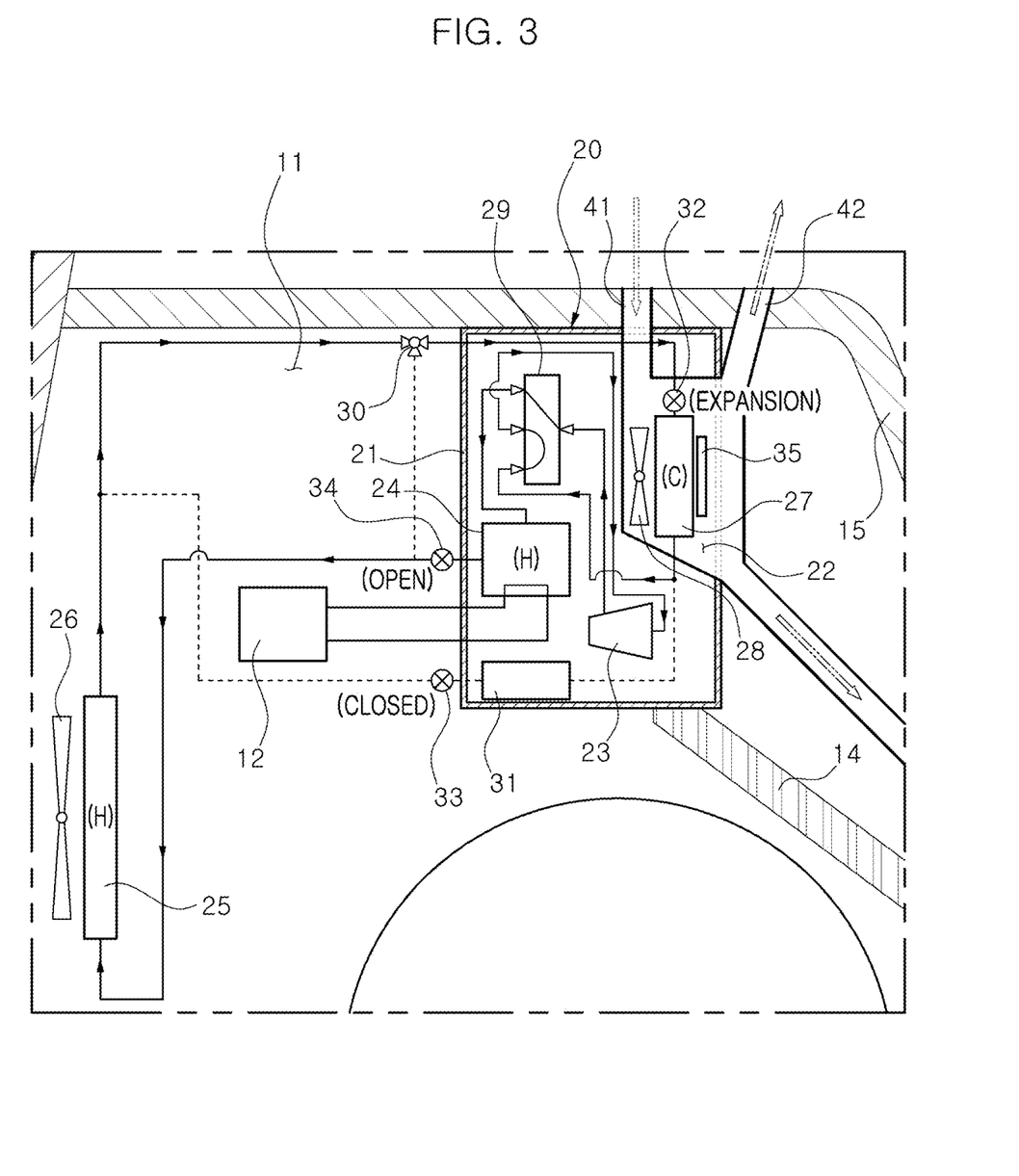
FIG. 3 is a schematic view exemplarily illustrating a state where the modular air conditioning system for an electric vehicle according to an exemplary embodiment of the present disclosure operates in an air-cooling mode.

FIG. 3 illustrates a state where the modular air conditioning system for an electric vehicle according to an exemplary embodiment of the present disclosure operates in an air-cooling mode.

In the air-cooling mode, the direction control valve 29 and the three-way valve 30 may be controlled to operate so that the refrigerant flows through the compressor 23, the water-cooling condenser 24, the air-cooling condenser 25, and the in-vehicle heat exchanger 27, and the compressor 23 may operate.

When the compressor 23 operates to air-cool the passenger compartment 13, the refrigerant compressed in the compressor 23 may be introduced into the water-cooling condenser 24 through the direction control valve 29, transfers heat to the coolant that cools the PE system 12 in the water-cooling condenser 24, and may be primarily liquefied. The refrigerant flowing through the water-cooling condenser 24 may be cooled in the air-cooling condenser 25 and may be secondarily liquefied. The refrigerant liquefied in the air-cooling condenser 25 may flow through the three-way valve 30, may be expanded in the first expansion valve 32, and may be thus pressure-decreased. Accordingly, the expanded refrigerant may vaporize in the in-vehicle heat exchanger 27. Air which is introduced by the blower 28 into the heat exchange portion 22 through the inlet duct 41 may be cooled while flowing through the in-vehicle heat exchanger 27. The cooled air may be supplied to the passenger compartment 13 along the vent duct 42, the floor duct 43, or the second-row duct 45 and thus air-cools the passenger compartment 13.

Figure 4:
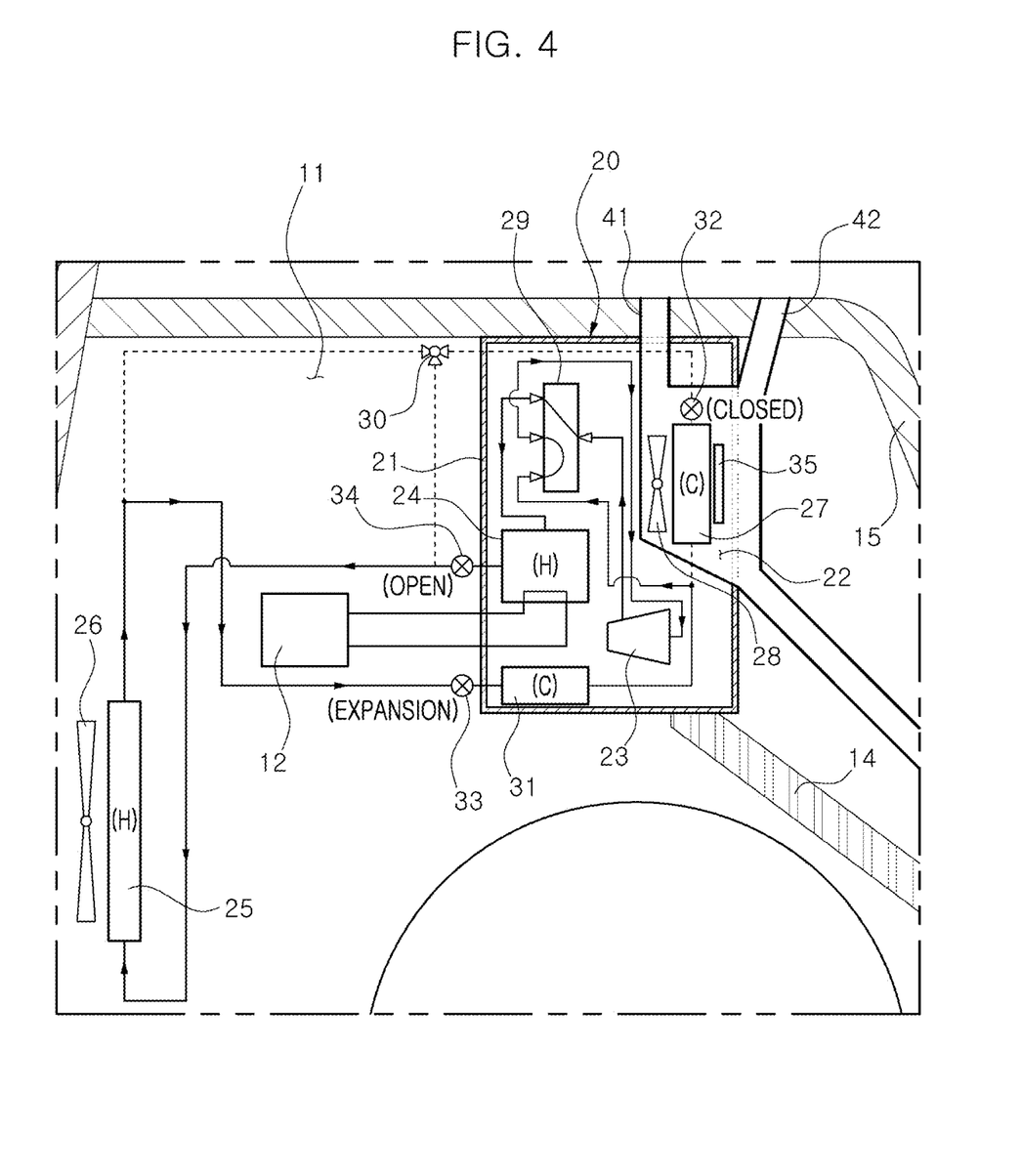
FIG. 4 is a schematic view exemplarily illustrating a state where the modular air conditioning system for an electric vehicle according to an exemplary embodiment of the present disclosure operates in a chiller mode.

FIG. 4 illustrates a state where the modular air conditioning system for an electric vehicle according to an exemplary embodiment of the present disclosure operates in a chiller mode.

Because the occupant is not present in the passenger compartment 13 while the battery 16 is charged, only the battery 16 may be cooled without air-cooling the passenger compartment 13.

In the chiller mode for cooling the battery 16, the direction control valve 29 and the three-way valve 30 may be controlled to operate so that the refrigerant flows through the compressor 23, the water-cooling condenser 24, the air-cooling condenser 25, and the chiller 31, and the compressor 23 may operate.

As in the air-cooling mode, the refrigerant flows from the compressor 23 all the way to the air-cooling condenser 25. Because the three-way valve 30 is closed, the refrigerant flowing through the air-cooling condenser 25 may flow to the second expansion valve 33 and the chiller 31. The refrigerant may be expanded in the second expansion valve 33 and then may be introduced into the chiller 31. In the chiller 31, the refrigerant may absorb heat of the battery coolant and evaporates, cooling the battery coolant. Thus, the battery 16 temperature-increased due to the charging may be cooled.

In the chiller 31, the three-way valve 30 may be in a state of blocking the refrigerant flowing through the air-cooling condenser 25 from flowing to the in-vehicle heat exchanger 27. Therefore, although the blower 28 may operate, the passenger compartment 13 may not be air-cooled.

Figure 5:
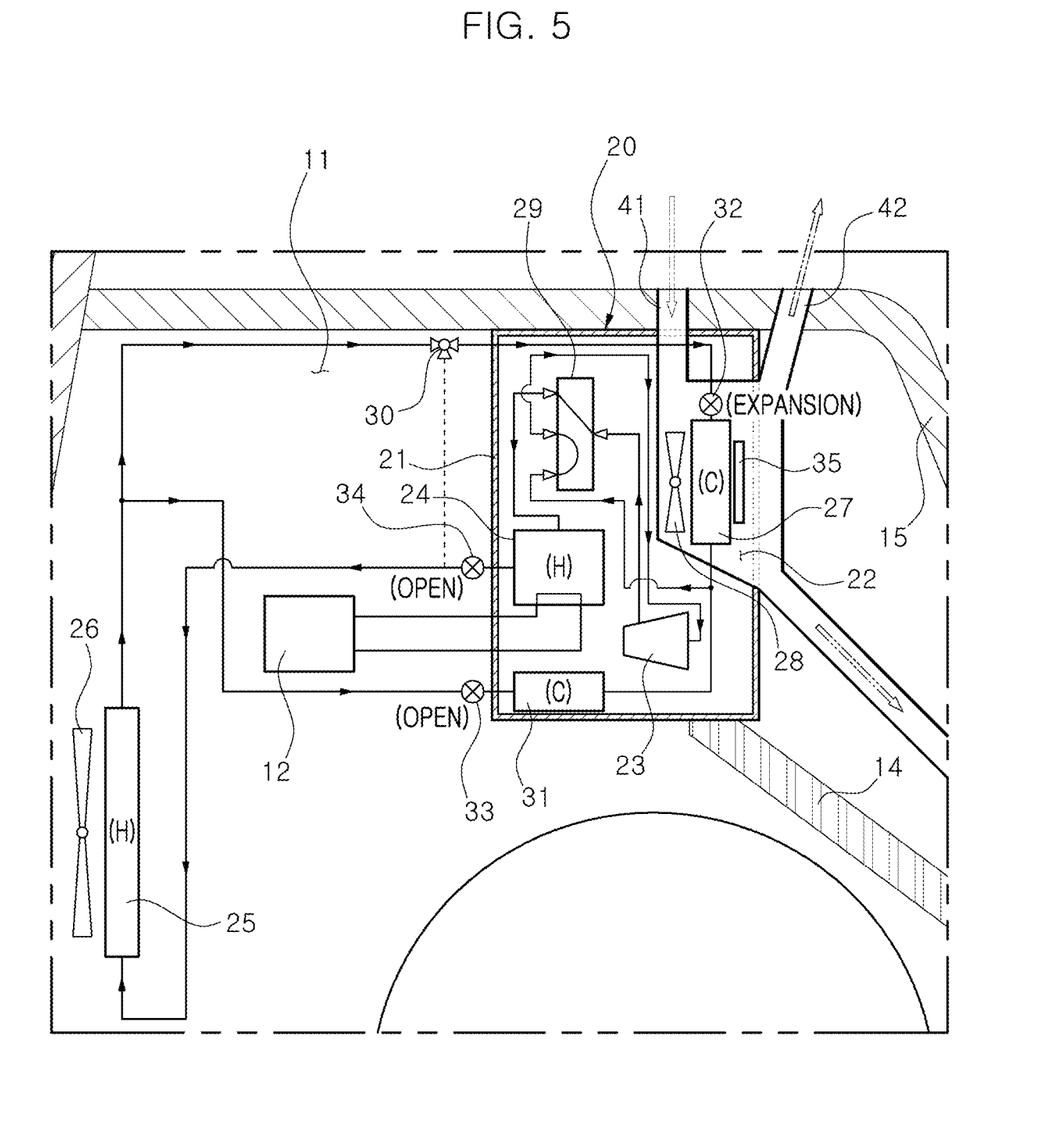
FIG. 5 is a schematic view exemplarily illustrating a state where the modular air conditioning system for an electric vehicle according to an exemplary embodiment of the present disclosure operates in an air-cooling and chiller mode.

FIG. 5 illustrates a state where the modular air conditioning system for an electric vehicle according to an exemplary embodiment of the present disclosure may operate in an air-cooling and chiller mode.

When the passenger compartment 13 is air-cooled, and at the same time, the battery 16 may be cooled, the modular air conditioning system for an electric vehicle operates in the air-cooling and chiller mode. For example, when the vehicle 1 travels at a high speed (i.e., a speed higher than a predetermined speed) during the summer season, the modular air conditioning system for an electric vehicle may operate in the air-cooling and chiller mode.

In the air-cooling and chiller mode, the three-way valve 30 may operate so that the air-cooling condenser 25 communicates with the first expansion valve 32, and the second expansion valve 33 operates as an expansion valve.

Accordingly, in the air-cooling and chiller mode, as in the cooling mode and the chiller mode, the refrigerant may flow from the compressor 23 all the way to the air-cooling condenser 25. When the refrigerant flows through the air-cooling condenser 25 in the air-cooling and chiller mode, as in the air-cooling mode, a portion of the refrigerant may air-cool the passenger compartment 13 while flowing to the first expansion valve 32 and the in-vehicle heat exchanger 27 through the three-way valve 30. As in the chiller mode, the remaining portion of the refrigerant that flows through the air-cooling condenser 25 may cool the battery 16 while flowing through the second expansion valve 33 and the chiller 31.

Figure 6:
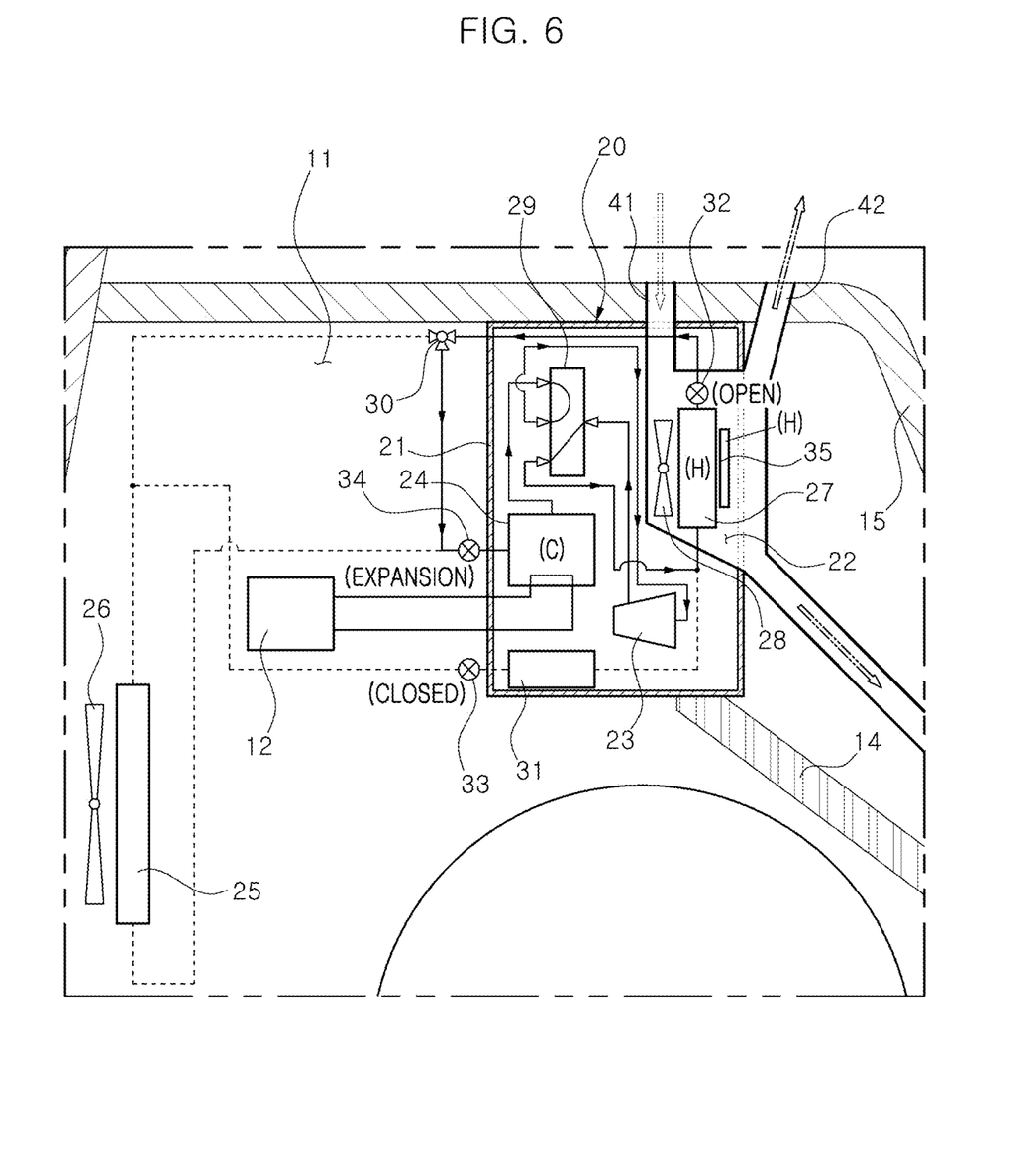
FIG. 6 is a schematic view exemplarily illustrating a state where the modular air conditioning system for an electric vehicle according to an exemplary embodiment of the present disclosure operates in an air-heating mode.

The modular air conditioning system for an electric vehicle, as illustrated in FIG. 6, may operate in the air-heating mode.

In the air-heating mode, while the refrigerant circulates through the compressor 23, the in-vehicle heat exchanger 27, the third expansion valve 34, and the water-cooling condenser 24, the heating and cooling module 20 may operate as a heat pump.

The refrigerant pressurized in the compressor 23 may air-heat the passenger compartment 13 while flowing to the in-vehicle heat exchanger 27 through the direction control valve 29. The refrigerant flowing through the in-vehicle heat exchanger 27 may be expanded in the third expansion valve 34 through the three-way valve 30. Accordingly, the expanded refrigerant may be introduced into the water-cooling condenser 24, absorbs heat in the water-cooling condenser 24, and evaporates, vaporizing. The refrigerant flows back to the compressor 23 and may be compressed therein, and thus one air-heating cycle may be completed.

The PTC heater 35 additionally operates. Thus, the passenger compartment 13 may be rapidly temperature-increased. Alternatively, the passenger compartment 13 may be air-heated at an extremely low temperature at which the efficiency of the heat pump may be decreased.

Figure 7:
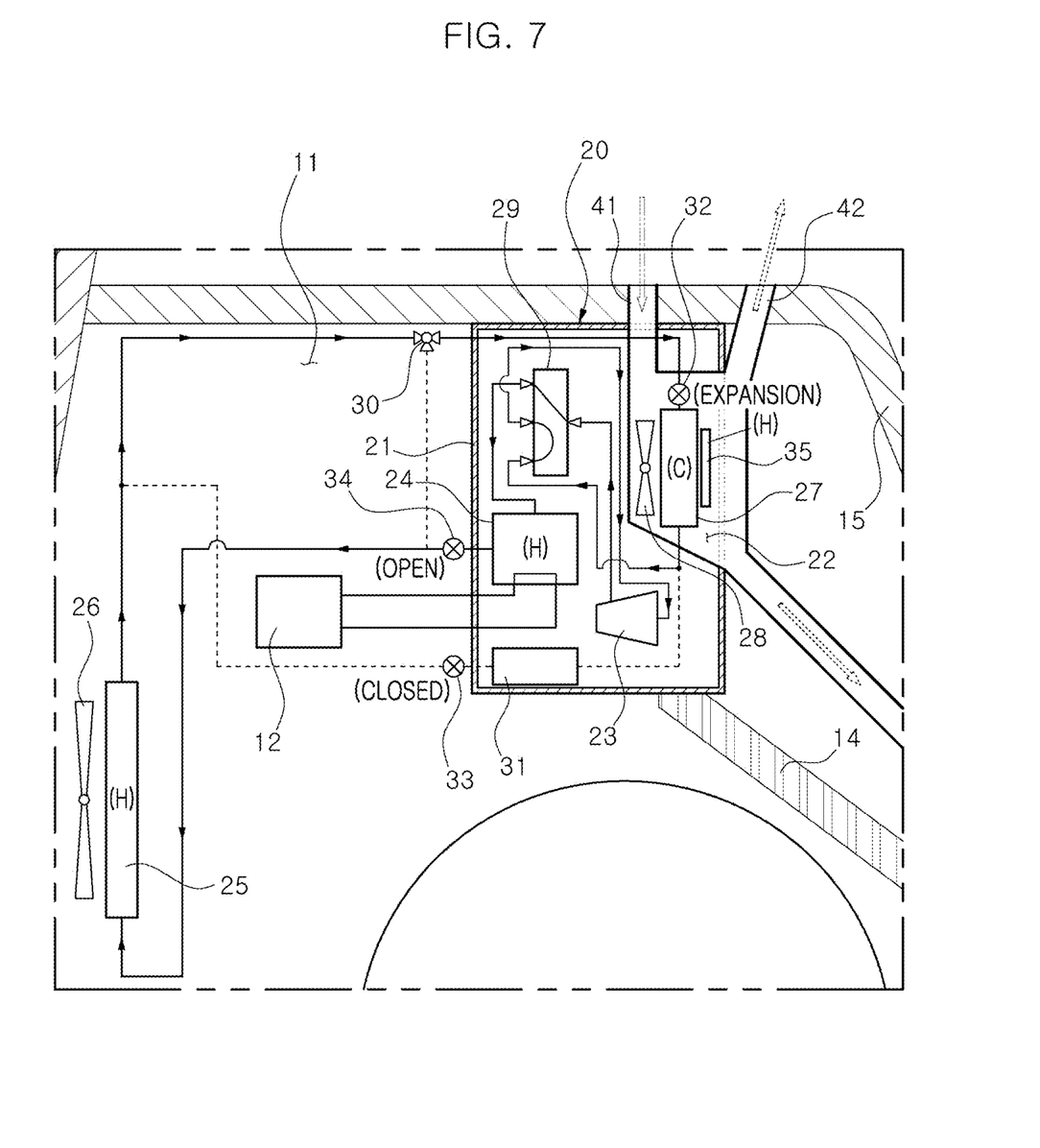
FIG. 7 is a schematic view exemplarily illustrating a state where the modular air conditioning system for an electric vehicle according to an exemplary embodiment of the present disclosure operates in a dehumidification mode.

FIG. 7 illustrates a state where the modular air conditioning system for an electric vehicle may operate in a dehumidification mode.

In a case where dehumidification is necessary when the season changes, in winter season, in the rainy season, or during heavy rain, the modular air conditioning system for an electric vehicle may operate in the dehumidification mode.

In the dehumidification mode, the refrigerant may circulate in the same as in the air-cooling mode and thus cools the air introduced from the in-vehicle heat exchanger 27 into the passenger compartment 13. At the same time, the PTC heater 35 may operate, performing dehumidification.

FIG. 8 is a schematic view exemplarily illustrating a state where conditioned air is supplied to a second-row duct 45 in the vehicle in which the modular air conditioning system for an electric vehicle according to an exemplary embodiment of the present disclosure.

In addition, the term related to a control device such as "controller", "control apparatus", "control unit", "control device", "control module", or "server", etc. refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method disclosed in the aforementioned various exemplary embodiments of the present invention.

The aforementioned invention can also be embodied as computer readable codes on a computer readable recording medium. The computer readable recording medium is any data storage device that can store data which can be thereafter read by a computer system and store and execute program instructions which can be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc. and implementation as carrier waves (e.g., transmission over the Internet). Examples of the program instruction include machine language code such as those generated by a compiler, as well as high-level language code that may be executed by a computer using an interpreter or the like.

In an exemplary embodiment of the present invention, each operation described above may be performed by a control device, and the control device may be configured by multiple control devices, or an integrated single control device.

In an exemplary embodiment of the present invention, the memory and the processor may be provided as one chip, or provided as separate chips.

In an exemplary embodiment of the present invention, the scope of the disclosure includes software or machine-executable commands (e.g., an operating system, an application, firmware, a program, etc.) for enabling operations according to the methods of various embodiments to be executed on an apparatus or a computer, a non-transitory computer-readable medium having such software or commands stored thereon and executable on the apparatus or the computer.

In an exemplary embodiment of the present invention, the control device may be implemented in a form of hardware or software, or may be implemented in a combination of hardware and software.

In addition, the terms such as "unit", "module", etc. disclosed in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of one or more of A and B". In addition, "one or more of A and B" may refer to "one or more of A or B" or "one or more of combinations of one or more of A and B".

In the exemplary embodiment of the present disclosure, it should be understood that a term such as "include" or "have" is intended to designate that the features, numbers, steps, operations, elements, parts, or combinations thereof described in the specification are present, and does not preclude the possibility of addition or presence of one or more other features, numbers, steps, operations, elements, parts, or combinations thereof.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A modular air conditioning system for a vehicle, the modular air conditioning system comprising:
   a dash panel making a division of the vehicle into a power electric (PE) system room in which a PE system for the vehicle is provided and a passenger compartment in which an occupant rides; and
   a housing provided on the dash panel,
   a heating and cooling module that supplies conditioned air to the passenger compartment, cools a battery for the vehicle, or cools the PE system, the heating and cooling module provided inside the housing,
   wherein a heat exchange portion is formed, as a separate space, by a wall partitioning off one side of the housing,
   wherein an inlet duct along which air is introduced from the passenger compartment is formed in the heat exchange portion,
   wherein a vent duct along which conditioned air is sent to a middle portion of the passenger compartment and a floor duct along which the conditioned air is sent to a lower portion of the passenger compartment are formed to be connected to the heat exchange portion,
   wherein the inlet duct and the vent duct pass through a first-row seat,
   wherein the first-row seat includes an upper portion, a lower portion and an inclined portion connecting the upper portion and the lower portion,
   wherein the housing is positioned between an upper end portion of the dash panel and the flat upper portion of the first-row seat,
   wherein the inlet duct and the vent duct adjacently pass through the upper portion of the first-row seat, and
   wherein the floor duct branches off from an air duct along which the conditioned air is sent to a second-row duct of the vehicle.

2. The modular air conditioning system of claim 1, wherein the heating and cooling module includes:
   a compressor configured to compress a refrigerant;
   a water-cooling condenser through which a PE system coolant cooling the PE system flows and in which the PE system coolant and the refrigerant exchange heat with each other;
   an in-vehicle heat exchanger in which the refrigerant and air in the passenger compartment exchange heat with each other;
   a first expansion valve mounted at an entrance of the in-vehicle heat exchanger; and
   a direction control valve configured to switch a direction of the refrigerant compressed by the compressor,
   wherein an air-cooling condenser in which the refrigerant and outside air exchange heat with each other is provided in the PE system room.

3. The modular air conditioning system of claim 2, wherein the heat exchange portion is positioned inside the housing-in which air introduced from the passenger compartment is heat exchanged.

4. The modular air conditioning system of claim 3, wherein the in-vehicle heat exchanger and a blower supplying the conditioned air to the passenger compartment are mounted in the heat exchange portion.

5. The modular air conditioning system of claim 4, wherein a positive temperature coefficient (PTC) heater is provided in the heat exchange portion.

6. The modular air conditioning system of claim 2, wherein a refrigerant line is formed so that the refrigerant circulates through the compressor, the direction control valve, the water-cooling condenser, the air-cooling condenser, the first expansion valve, and the in-vehicle heat exchanger and then back to the compressor through the direction control valve.

7. The modular air conditioning system of claim 6, wherein the heating and cooling module further includes:
   a chiller through which a battery coolant cooling the battery flows and in which the battery coolant and the refrigerant exchange heat with each other, and
   wherein the refrigerant line branches off from an exit of the air-cooling condenser and is connected to the direction control valve to pass through the chiller.

8. The modular air conditioning system of claim 7, wherein a second expansion valve is provided at an entrance of the chiller.

9. The modular air conditioning system of claim 6, wherein the refrigerant line is formed to branch off from a three-way valve mounted between the air-cooling condenser and the first expansion valve and to connect the water-cooling condenser and the air-cooling condenser to each other.

10. The modular air conditioning system of claim 9, wherein a third expansion valve is mounted between the three-way valve and the air-cooling condenser.

11. The modular air conditioning system of claim 2, further including a controller configured for:
    in an air-cooling mode, circulating the refrigerant through the compressor, the direction control valve, the water-cooling condenser, the air-cooling condenser, the first expansion valve, the in-vehicle heat exchanger, and the direction control valve, wherein the refrigerant is expanded in the first expansion valve, and cools air, introduced from the passenger compartment, in the in-vehicle heat exchanger.

12. The modular air conditioning system of claim 8, further including a controller configured for:
    in a chiller mode, circulating the refrigerant through the compressor, the direction control valve, the water-cooling condenser, the air-cooling condenser, the second expansion valve, the chiller, and the direction control valve, wherein the refrigerant is expanded in the second expansion valve and cools the battery coolant in the chiller.

13. The modular air conditioning system of claim 8, further including a controller configured for:
    in an air-cooling and chiller mode, circulating a part of the refrigerant through the compressor, the direction control valve, the water-cooling condenser, the air-cooling condenser, the first expansion valve, the in-vehicle heat exchanger, and the direction control valve, wherein the refrigerant is expanded in the first expansion valve, and cools air, introduced from the passenger compartment, in the in-vehicle heat exchanger, and wherein a remaining portion of the refrigerant dividedly circulates from the exit of the air-cooling condenser to the second expansion valve, the chiller, and the direction control valve and is expanded in the second expansion valve, and cools the battery coolant in the chiller.

14. The modular air conditioning system of claim 8, further including a controller configured for:
    in an air-heating mode, circulating the refrigerant through the compressor, the direction control valve, the in-vehicle heat exchanger, the first expansion valve, the second expansion valve, the water-cooling condenser, and the direction control valve, wherein the refrigerant air-heats air, introduced from the passenger compartment, in the in-vehicle heat exchanger.

15. The modular air conditioning system of claim 14, wherein, in the air-heating mode, the controller is configured to operate a PTC heater provided in the heat exchange portion mounted inside the housing.

16. The modular air conditioning system of claim 2, further including a controller configured for:
    in a dehumidification mode, circulating the refrigerant through the compressor, the direction control valve, the water-cooling condenser, the air-cooling condenser, the first expansion valve, the in-vehicle heat exchanger, and the direction control valve, wherein the refrigerant is expanded in the first expansion valve, and operating a PTC heater, provided in the heat exchange portion formed inside the housing.

17. The modular air conditioning system of claim 1, further including:
    the floor duct along which the conditioned air is sent from the heat exchange portion to a floor of the passenger compartment are connected to the heat exchange portion.

18. The modular air conditioning system of claim 1, wherein the vehicle is an electric vehicle including a purpose-built vehicle (PBV).

19. An electric vehicle including a modular air conditioning system of claim 1.

* * * * *